Patented Oct. 11, 1949

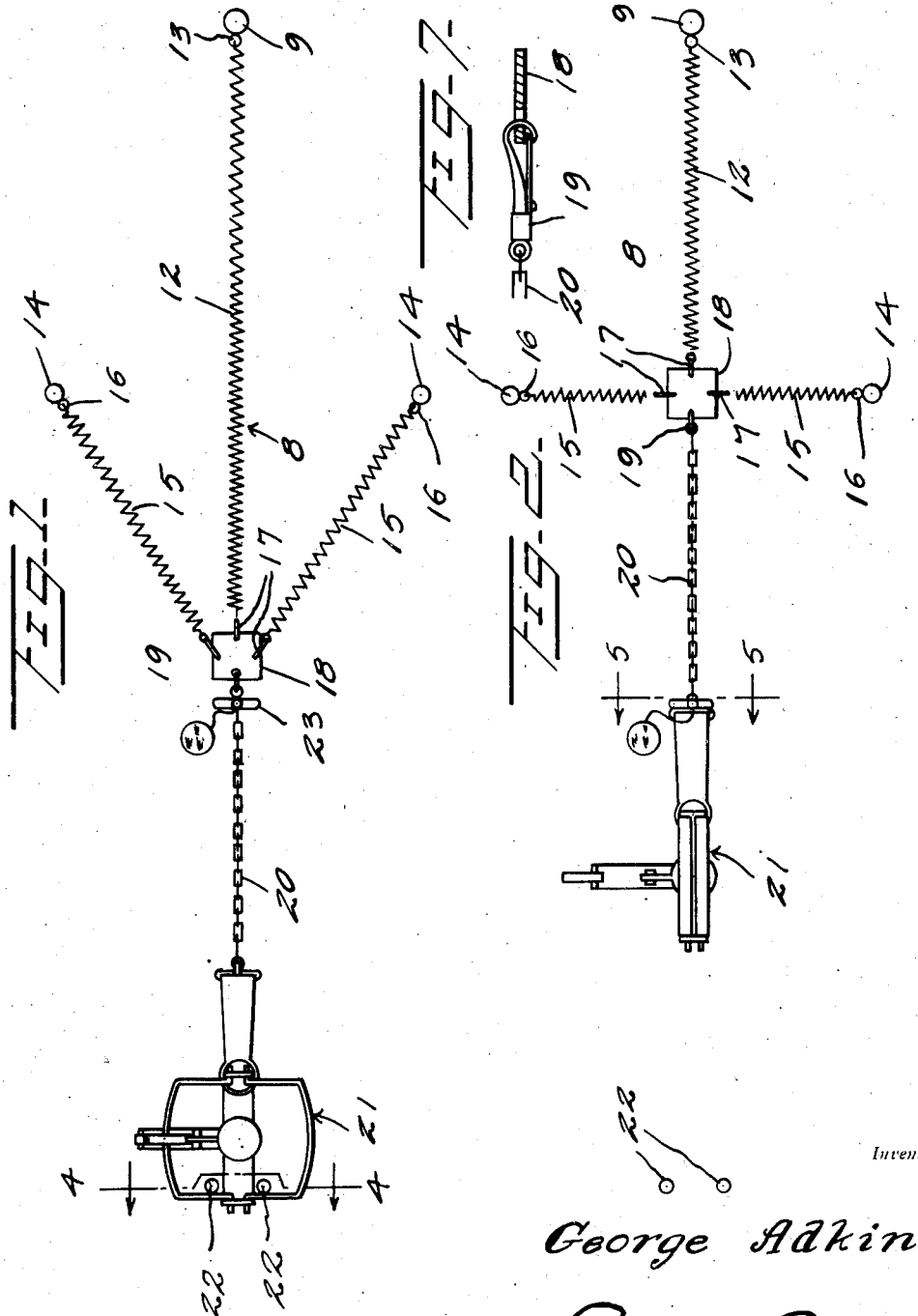

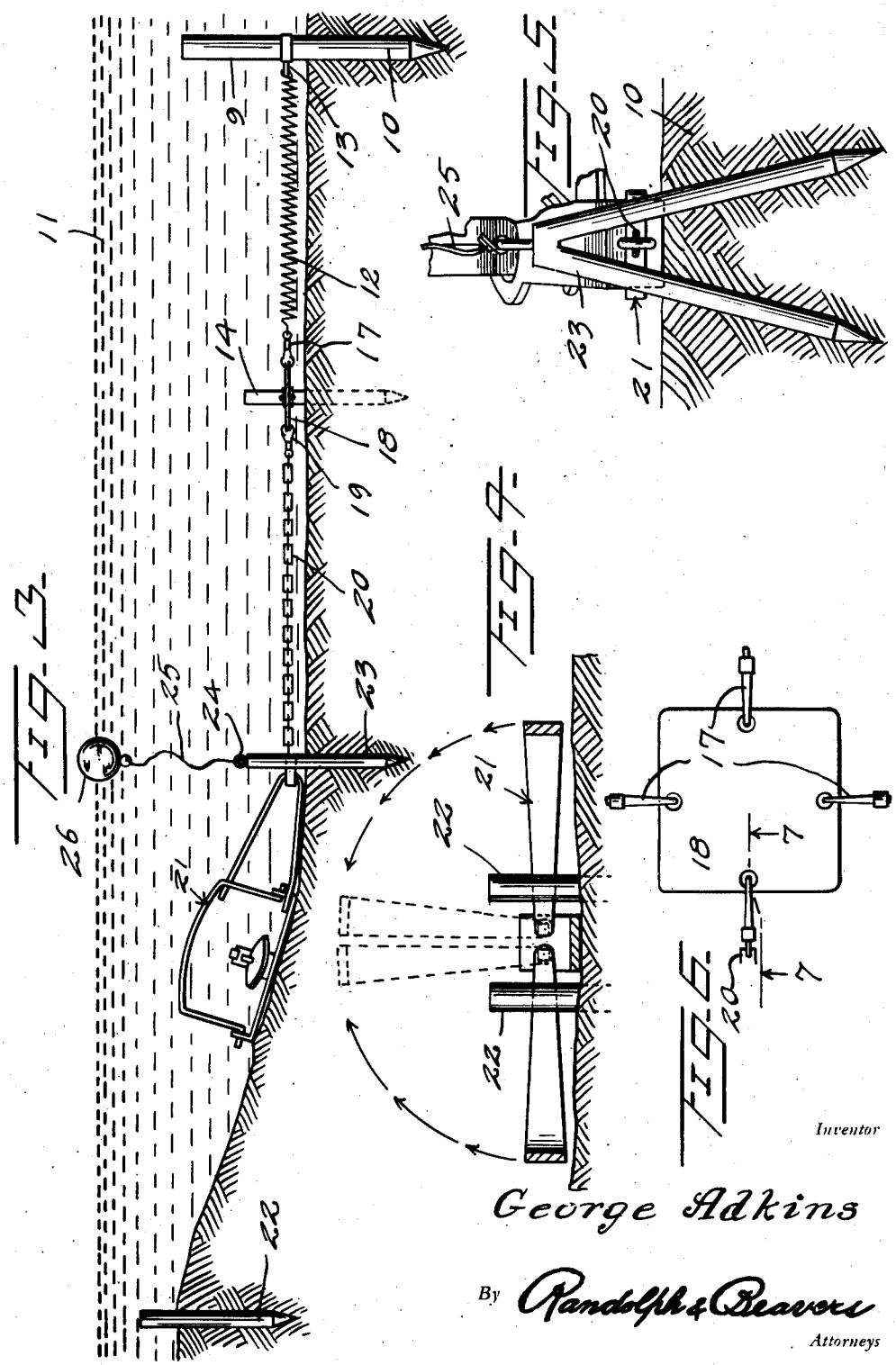

2,484,479

UNITED STATES PATENT OFFICE 2,484,479

DROWNING ATTACHMENT FOR TRAPS

George Adkins, Portsmouth, Ohio

Application June 27, 1947, Serial No. 757,474

3 Claims. (Cl. 43—96)

This invention relates to an anchoring attachment for traps used in the trapping of fur bearing animals and has particular reference to an anchoring attachment adapted for use for traps which are set on the banks of or in shallow portions of a stream and which will function, upon release of the trap for dragging the trap and an animal entrapped thereby into a deeper part of the stream and to adjacent the bottom for drowning the animal to prevent the animal from damaging its fur in attempting to tear or gnaw itself free from the trap.

More particularly, it is an object of the present invention to provide an anchoring attachment of extremely simple construction and which is constructed and arranged to function in conjunction with a conventional trap having upwardly closing spring jaws, for releasing the attachment, upon release of the trap jaws to cause the attachment to function to pull the trap into a submerged position in deep water.

Still another object of the invention is to provide an anchoring means which will effectively function to hold the trap in substantially a predetermined position after release and in the bed of a stream.

Still a further object of the invention is to provide an anchoring attachment which will effectively function to prevent displacement of the trap due to current or rough water in a stream and before release of the trap.

Various other objects and advantages of the invention will hereinafter become more fully apparent from the following description of the drawings, illustrating a preferred embodiment thereof, and wherein:

Figure 1 is a plan view showing the trap in a set position;

Figure 2 is a similar view showing the trap in a released position;

Figure 3 is a side elevational view showing the trap in its released position and disposed in the bed of a stream or body of water;

Figure 4 is a cross sectional view taken substantially along a plane as indicated by the line 4—4 of Figure 1;

Figure 5 is a cross sectional view taken substantially along a plane as indicated by the line 5—5 of Figure 2;

Figure 6 is an enlarged plan view of a portion of the drowning or anchoring attachment, and Figure 7 is a sectional view thereof taken substantially along a plane as indicated by the line 7—7 of Figure 6.

Referring more specifically to the drawings, the drowning or anchoring attachment constituting the invention, is designated generally 8, and includes a main or central stake 9, which is adapted to be driven into the bed 10 of the deep portion of a stream or other body of water 11 and to which one end of a contractile coil spring 12 is fastened as by a ring 13 which engages around the stake 9, above and adjacent its embedded portion.

The drowning attachment 8 also includes two side stakes 14, which are disposed between the stake 9 and adjacent the bank or shallow portion of the stream 11 and which are disposed, one on the upstream and one on the downstream side of a transverse line extending from stake 9 to the adjacent bank or shallow stream portion. A contractile coil spring 15 has an end connected to each of the anchoring stakes 14 also as by means of a ring 16, and springs 15 are connected at their opposite ends by snaps 17 to oppositely disposed openings of a plate 18. Likewise, the opposite end of the spring 12 is fastened to an opening of the plate 18 by another snap hook or fastening 17 and if desired, the remote ends of the springs 12 and 15 may be attached to the stakes 9 and 14 by snap hooks 17.

The plate 18 is also provided with an opening to receive a snap hook 19 attached to the free end of an anchoring chain 20 of a conventional trap 21 of the type provided with a pair of spring jaws which are urged upwardly to closed positions upon release and which are disposed in outwardly extending relationship relatively to one another when the trap is set. The chain 20 extends from the plate 18 in the opposite direction to the spring 12 and is disposed substantially at right angles to the springs 15 when the drowning or anchoring attachment 8 is in a released position, as illustrated in Figure 2.

The drowning or anchoring attachment 8 also includes a pair of substantially upright stakes 22 which are adapted to be driven into a shallow portion of the stream bed 10, as seen in Figure 3, or which may be driven into the ground on the bank of the stream or body of water 11, and which are laterally spaced, relatively to the longitudinal axis of the trap 21. The anchoring or drowning attachment 8 also includes a forked member 23, the downwardly diverging legs of which are anchored in the stream bed 10 between and substantially in alignment with the stakes 9 and 22. As seen in Figure 5, the bight portion of the fork member 23 is disposed above the stream bed 10 to provide a restricted opening through which the chain 20 extends and in which said chain is loosely disposed. The forked member 23 is provided with an eye 24 which projects upwardly from its bight portion and to which one end of a flexible member, such as a line 25 is anchored. A float 26 is fastened to the opposite end of the line 25 and said line is of sufficient length to permit the float 26 to assume a position on the surface of the stream 11 and for indicating the location of the fork member 23 and accordingly the location of the trap 21 after its release, as will hereinafter become apparent.

The trap 21 is set in a conventional manner and the springs 12 and 15 are then extended from their positions of Figure 2 to their positions of Figure 1, so that the outer legs of the jaws of the trap 21 can be positioned on the outer side of the stakes 22, which thus afford an anchor for retaining the trap 21 either in the shallow portion of the stream bed or on the bank of the stream 11 and with the springs 12 and 15 under tension so as to cooperate with the stakes 22 for holding the trap 21 in a predetermined and fixed position, and so that it will not be moved by rough water or strong current in the stream. The stakes 21 are disposed upright and extend only a relatively short distance above the level of the stream bed or bank in which they are disposed, so that when the trap 21 is sprung by an animal pressing upon the hand or pedal thereof, the jaws of the trap will be free to swing upwardly toward closed position for entrapping the animal. This upward movement of the trap jaws will disengage them from the stakes 22 and this disengagement will be further facilitated by the tendency of the trap to jump when released. Accordingly, the trap will be released from the anchoring stakes 22, as the animal is entrapped therein and so that the springs 12 and 15 may retract from drawing the trap from left to right of Figures 1 and 3 toward the deep portion of the stream 11 and so that the adjacent end of the trap will be moved into bearing engagement with the forked stake 23. When thus disposed, as seen in Figure 2, at least the spring 12 will still be partially under tension to cooperate with the fork 23 for holding the trap 21 in a predetermined position against the fork 23 and so that the trap will be sufficiently below the surface of the stream 11 to quickly drown the animal and prevent it from tearing or gnawing itself loose from the trap or from tearing its fur in attempting to escape. The float 26 will function as a marker for indicating the location of the trap to enable the entrapped animal to be readily retrieved therefrom.

The spring 12 is ordinarily of a greater length than the springs 15 and springs may be made of various lengths and strengths, depending upon the size of the trap with which the attachment 8 is adapted for use.

Wire or snap fastenings may be substituted for the rings 13 and 16 for anchoring the remote ends of the chains 12 and 15 to the stakes 9 and 14, respectively, and various other modifications and changes are likewise contemplated and may obviously be resorted to, without departing from the spirit and scope of the invention, as hereinafter defined by the appended claims.

I claim as my invention:

1. In a drowning attachment for traps used in the trapping of fur bearing animals, a jaw trap having an anchoring chain attached thereto, anchoring means adapted to be secured in a stream bed, resilient means anchored to said anchoring means and adapted to be connected to the trap, a trap anchoring means adapted to be secured in a shallow portion of the stream bed or on the stream bank and constructed and arranged to engage and anchor the trap when in a set position and for retaining the resilient means of the attachment under tension, said trap anchoring means being constructed and arranged to release the trap when sprung whereby the resilient means will retract for drawing the trap toward the first mentioned anchoring means and into deep water for drowning the entrapped animal, and a forked stake adapted to be driven into the stream bed to provide an arch portion disposed thereabove and through which the anchoring chain of the trap loosely extends, said forked stake being disposed between the anchoring means and trap anchoring means to provide a stop for the trap upon contraction of the resilient means and for retaining the trap, after release, in a predetermined position on the stream bed.

2. An anchor attachment for traps adapted for use with jaw traps employed in the trapping of fur bearing animals, said traps having anchoring chains attached thereto, comprising anchoring elements constructed and arranged to engage and hold a trap when in a set position, a plurality of resilient members, and an attaching member connected to the adjacent ends of said resilient members and to the free end of the anchoring chain of the trap, said resilient members being anchored at their opposite ends and being normally disposed with one of said resilient members substantially in line with the trap chain when the other resilient members are disposed substantially at right angles thereto, said resilient members being disposed under tension when the trap is in a set position and held by said anchoring elements, and said anchoring elements being constructed and arranged to release the trap when sprung for permitting the trap to be drawn toward the anchored ends of said resilient members.

3. An anchoring attachment as in claim 1, and a stop member through which the trap chain extends and which is constructed and arranged to cooperate with said resilient means, when the trap is sprung, for holding the sprung trap in a predetermined position and for retaining the resilient means partially under tension.

GEORGE ADKINS.

REFERENCES CITED

The following references are of record in the file of this patent:

UNITED STATES PATENTS

| Number | Name | Date |
| --- | --- | --- |
| 2,252,405 | Navin | Aug. 12, 1941 |
| 2,419,162 | Pope | Apr. 15, 1947 |